May 23, 1933.  G. F. NYE  1,910,357
CENTRIFUGAL THRESHING MACHINE
Filed Jan. 22, 1931
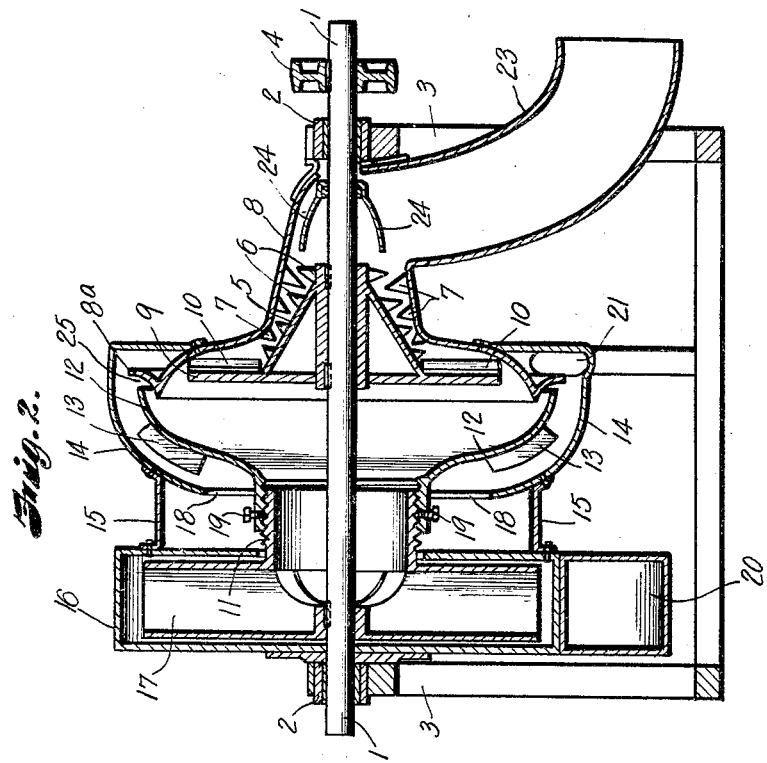
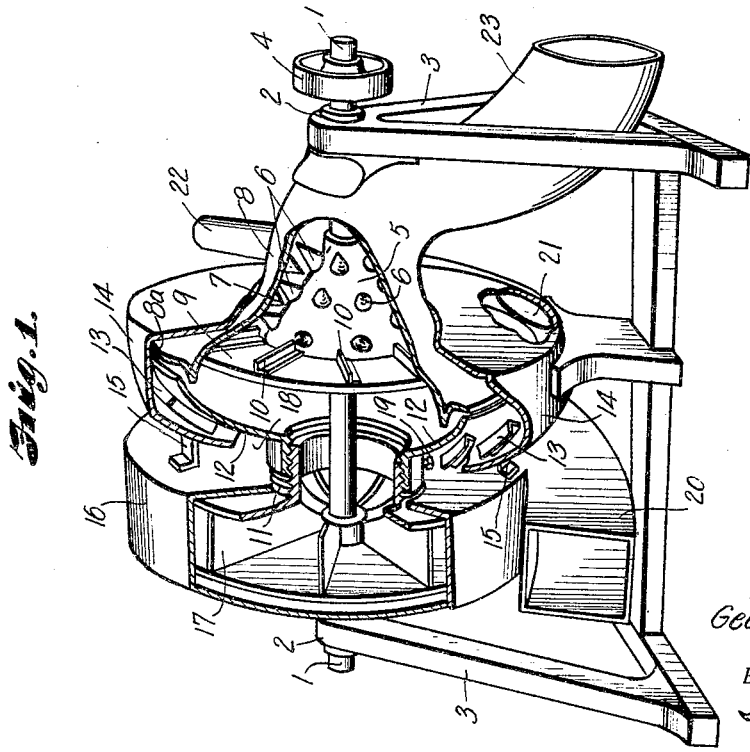
INVENTOR
George Francis Nye
BY
Thos. E. Scofield
ATTORNEY Patented May 23, 1933

1,910,357

UNITED STATES PATENT OFFICE

GEORGE FRANCIS NYE, OF KEARNEY, NEBRASKA

CENTRIFUGAL THRESHING MACHINE

Application filed January 22, 1931. Serial No. 510,468.

This invention relates to improvements in a centrifugal threshing machine, and refers more particularly to a centrifugal machine in which is used an air blast for discharging straw from the machine, and an auxiliary counter blast for separating the grain kernels from the chaff and straw. Further novelty resides in the employment of an adjustable rotating cone which furnishes the counter blast air stream and may be arranged to more effectively separate different types of grain from the chaff, straw and deleterious material threshed from the grain.

Fig. 1 is a perspective view of the machine with parts broken away.

Fig. 2 is a sectional elevation of the machine.

Referring to the drawing, a shaft 1 is mounted in bearings 2, supported by the standards 3. The shaft is driven by means of a pulley 4, or it may be direct connected to any suitable source of power not shown. On the shaft is mounted a threshing cone 5 equipped with pegs 6 which are staggered with similar pegs 7 positioned within the housing 8 which surrounds the threshing cone. At the base of the threshing cone is a distributing disk 9 equipped with veins or blades 10. The housing 8 encloses the cone 5 and is shaped to extend beyond the disk 9 terminating in an enlarged bell shaped mouth or opening having a turn back portion 8A. Also on the shaft 1 is a threaded hub 11 which carries the adjustable discharge cone 12. On the convex surface of the cone are a plurality of veins or blades 13 which create a counter air blast, hereinafter explained. The cone 12 is enclosed by a housing 14 which is braced as shown at 15 to a fan housing 16, enclosing an exhaust fan 17.

In the housing 14 is an air inlet opening 18. Set screws 19 show one means of adjusting the cone 12 upon the hub 11. At 20 is shown a fan exhaust conduit and shaped in the housing 14 is a volute or duct 21 terminating in a grain discharge pipe 22.

In operation, the crop is supplied through the conveyor pipe 23 and is picked up by the prongs 24 attached to the shaft 1 which in rotating bulk the material and prevent its clogging in the throat of the housing 8. Between the staggered pegs 6 and 7 the grain is threshed and the threshed materials discharged on to the blades 10 of the distributing disk 9 from which they are discharged at high velocity on to the inside surface of the cone shaped housing 8. The chaff and straw is drawn by the vacuum created by the fan 17 and follows the inside surface of the discharge cone into the fan 17 from which it is exhausted through the pipe 20. The heavier grain kernels discharged at high velocity from the disk 9, follow the contour or inside surface of the housing 8 and are discharged on to the rotating discharge cone 12 near its outer extremity. The centrifugal force imparted to these heavier grain kernels is sufficiently strong to overcome the suction created by the fan 17 and consequently they will follow the surface of the cone 12 and pass out through the annular space 25 between the stationary cone 8 and the rotating cone 12.

A counter blast is set up by air introduced through the air inlet 18 and created by the veins 13 on the cone 12. A portion of this counter blast air current passes through the annular space 25 in an opposed direction to the grain kernels and cleans from the kernels bulky materials such as weeds, straw joints, or the like, which are heavier than the straw and would tend to follow the grain into the grain discharge duct 21. This counter blast is an effectual means for cleaning the grain of these deleterious materials which constitute an intermediate material between the grain kernels and the chaff and straw, and have a tendency to follow the grain instead of the chaff and straw in the air current passing to the discharge fan 17.

The shaping of the bell mouth of the stationary cone and the flanged or turn back portion 8A, as well as the cone 12 and its adjustment relative the stationary housing, are important factors in the complete cleaning of the grain with this type of machine.

It is contemplated that the machine may be used as a stationary threshing machine or as a threshing unit positioned on a combine harvester. Also the power may be delivered to the unit from an extraneous source or supplied by a direct connected internal combustion engine or other suitable power source.

I claim as my invention:

1. A centrifugal threshing machine comprising in combination a housing, a shaft rotatably mounted in said housing, coacting threshing elements mounted on said shaft and said housing respectively, a centrifugal impeller member mounted on said shaft for rotation therewith imparting centrifugal momentum to the threshed mass in a direction intersecting the axis of said shaft, a suction fan adapted to create an air stream of sufficient velocity to overcome the momentum of the chaff while insufficient to affect that of the grain whereby a separation of the grain and the chaff is effected, a second centrifugal impeller member mounted for rotation with said shaft, said second impeller member being provided with radial and longitudinally extending portions positioned between the first impeller member and the fan to receive material from the threshing elements and first impeller member and to impart centrifugal momentum to any unseparated grain.

2. A centrifugal threshing machine as in claim 1 having a blower fan setting up a secondary air stream in a direction opposed to the travel of the grain to assist in the separation.

In testimony whereof I affix my signature.

GEORGE FRANCIS NYE.